(12) United States Patent
Kim et al.

(10) Patent No.: US 11,916,239 B2
(45) Date of Patent: Feb. 27, 2024

(54) APPARATUS FOR FABRICATING MEMBRANE-ELECTRODE-SUBGASKET ASSEMBLY AND METHOD FOR FABRICATING MEMBRANE-ELECTRODE-SUBGASKET ASSEMBLY USING THE SAME

(71) Applicants: Hyundai Motor Company, Seoul (KR); Kia Corporation, Seoul (KR)

(72) Inventors: Min Jin Kim, Seoul (KR); Ki Sub Lee, Yongin-si (KR); Yong Min Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 74 days.

(21) Appl. No.: 17/452,325

(22) Filed: Oct. 26, 2021

(65) Prior Publication Data
US 2022/0158200 A1  May 19, 2022

(30) Foreign Application Priority Data
Nov. 16, 2020  (KR) .................. 10-2020-0152978

(51) Int. Cl.
*H01M 4/88* (2006.01)
*H01M 8/1004* (2016.01)

(52) U.S. Cl.
CPC ....... *H01M 4/8896* (2013.01); *H01M 4/8882* (2013.01); *H01M 8/1004* (2013.01)

(58) Field of Classification Search
None
See application file for complete search history.

(56) References Cited

U.S. PATENT DOCUMENTS

| | | | |
|---|---|---|---|
| 2011/0151350 A1 | 6/2011 | Iverson et al. | |
| 2014/0093807 A1* | 4/2014 | Iverson ................ | H01M 8/242 429/465 |
| 2017/0256810 A1* | 9/2017 | Lee .................... | H01M 8/0286 |
| 2021/0202970 A1 | 7/2021 | Lee et al. | |

FOREIGN PATENT DOCUMENTS

| | | | | |
|---|---|---|---|---|
| EP | 3823068 A1 * | 5/2021 | ............. | H01M 8/00 |
| JP | 5902806 B2 | 4/2016 | | |
| JP | 2017068899 A1 | 4/2017 | | |
| JP | 2018142407 A | 9/2018 | | |
| KR | 1575312 B1 | 12/2015 | | |
| KR | 20160131748 A | 11/2016 | | |

* cited by examiner

Primary Examiner — Haroon S. Sheikh
(74) Attorney, Agent, or Firm — Slater Matsil, LLP (57) ABSTRACT

An embodiment apparatus for fabricating a membrane-electrode-subgasket assembly includes a feeding unit including a sheet feeding roller configured to feed a membrane-electrode assembly sheet having catalyst layers provided on both surfaces thereof, a cutting unit including a cutting roller and a support roller configured to rotate in engagement with the cutting roller, wherein the cutting roller is configured to punch portions outside each of the catalyst layers, a first pressing unit including a suction roller and a first hot roller, and a second pressing unit including second hot rollers.

20 Claims, 10 Drawing Sheets

APPARATUS FOR FABRICATING MEMBRANE-ELECTRODE-SUBGASKET ASSEMBLY AND METHOD FOR FABRICATING MEMBRANE-ELECTRODE-SUBGASKET ASSEMBLY USING THE SAME

CROSS-REFERENCE TO RELATED APPLICATIONS

This application claims the benefit of Korean Patent Application No. 10-2020-0152978, filed on Nov. 16, 2020, which application is hereby incorporated herein by reference.

TECHNICAL FIELD

The present disclosure relates to an apparatus for fabricating a membrane-electrode-subgasket assembly and a method for fabricating a membrane-electrode-subgasket assembly.

BACKGROUND

A membrane-electrode-subgasket assembly has been fabricated using a decal process by hot pressing, a process of applying electrodes directly to an electrolyte membrane, or a process of hot-pressing gas diffusion electrodes (GDEs) onto an electrolyte membrane. In particular, the decal process is a method of aligning a release film coated with an anode and a cathode with an electrolyte membrane and then hot-pressing the release film onto the electrolyte membrane at high temperature and high pressure, and may solve problems with other fabrication methods, such as deformation of the electrolyte membrane and loss of electrodes during fabrication processes, and has a particular advantage in that a continuous fabrication process using a roll press is possible.

Figure 1:
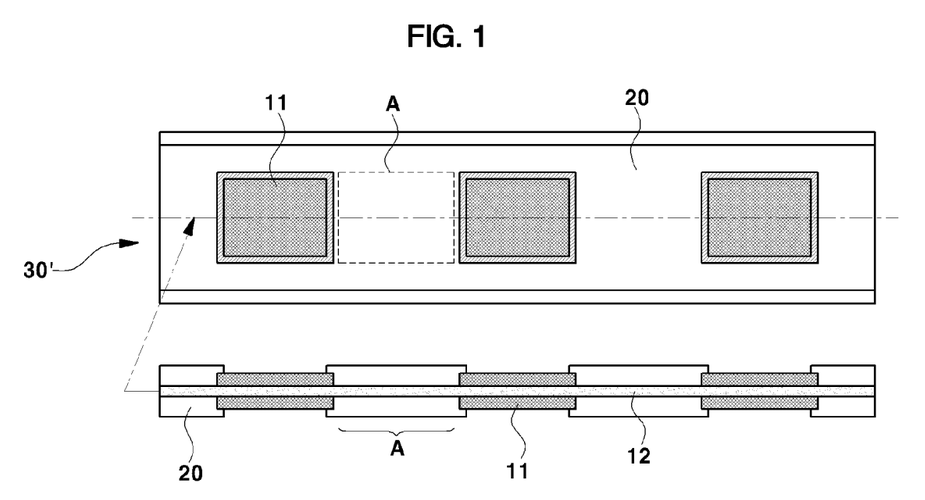
FIG. 1 illustrates the structure of a membrane-electrode-subgasket assembly according to a conventional art.

However, due to the nature of the roll-to-roll based continuous fabrication process, there is no cutting of an electrolyte membrane sheet during the process, and thus unnecessary electrolyte membrane portions that do not participate directly in an electrochemical reaction occur. FIG. 1 schematically shows a top view and a sectional view of a conventional membrane-electrode-subgasket assembly 30'. Referring thereto, it can be seen that an unnecessary electrolyte membrane portion exists in a region A.

In recent years, an apparatus and a method for fabricating a membrane-electrode-subgasket assembly have been studied to reduce the unnecessary use of the electrolyte membrane. However, there is a limit to increasing the efficiency of membrane-electrode-subgasket assembly fabrication, due to other new problems arising while the above-described problem is solved.

SUMMARY

The present disclosure relates to an apparatus for fabricating a membrane-electrode-subgasket assembly and a method for fabricating a membrane-electrode-subgasket assembly. Particular embodiments relate to an apparatus and a method for efficiently fabricating a membrane-electrode-subgasket assembly in a continuous fabrication process by using a cutting roller that forms a cut line in a membrane-electrode assembly sheet, and a suction roller that sucks a membrane-electrode assembly using a suction force and laminates the sucked membrane-electrode assembly onto a subgasket.

An embodiment of the present disclosure provides an apparatus and a method for efficiently fabricating a membrane-electrode-subgasket assembly in a continuous fabrication process without wasting an electrolyte membrane.

Another embodiment of the present disclosure provides a fabrication apparatus having a novel structure and a fabrication method, which enable both suction of the membrane-electrode assembly and hot pressing of the membrane-electrode assembly to subgaskets in a continuous fabrication process.

Still another embodiment of the present disclosure provides an apparatus and a method for fabricating a membrane-electrode-subgasket assembly, which may use an adhesive while enabling both suction of the membrane-electrode assembly and hot pressing of the membrane-electrode assembly to subgaskets to be efficiently performed in a continuous fabrication process.

Yet another embodiment of the present disclosure provides an apparatus and a method for fabricating a membrane-electrode-subgasket assembly, which are capable of efficiently controlling the amount of electrolyte membrane used in a continuous fabrication process and achieving a high fabrication yield of a membrane-electrode-subgasket assembly.

Embodiments of the present disclosure are not limited to the above-mentioned embodiments. Embodiments of the present disclosure will become more apparent from the following description, and will be realized by means described in the appended claims and combinations thereof.

In accordance with an embodiment of the present disclosure, there is provided an apparatus for fabricating a membrane-electrode-subgasket assembly, the apparatus including a feeding unit including a sheet feeding roller configured to feed a membrane-electrode assembly sheet having catalyst layers provided on both surfaces thereof, a cutting unit including a cutting roller and a support roller configured to rotate in engagement with the cutting roller, a first pressing unit including a suction roller and a hot roller, and a second pressing unit including hot rollers, wherein the cutting roller punches portions outside each of the catalyst layers.

The cutting roller may include a cylindrical cutting body configured to rotate about a central axis thereof and at least one cutting blade portion provided on the outer circumferential surface of the cutting body along the rotation direction of the cutting body.

The cutting blade portion may include cutting blades protruding in a square frame shape.

The cutting blades protrude discontinuously.

The first pressing unit may include a suction roller and a hot roller configured to rotate in engagement with the suction roller, and the second pressing unit may include a pair of hot rollers configured to rotate in engagement with each other.

The suction roller may linearly move with respect to the hot roller of the first pressing unit by a predetermined distance.

The suction roller may include a cylindrical suction body configured to rotate about a central shaft thereof and a suction portion formed on an outer circumferential surface of the suction body and including at least one suction hole.

The suction roller may suck external air through the suction hole

The suction roller may further include a buffer member configured to surround the suction roller on an outer circumferential surface thereof.

The buffer member may have a thickness of 100 µm or less, a porosity of 60% to 70%, and an airflow rate of 0.060 to 0.070 cfm.

The hot roller included in the first pressing unit may have a temperature of 50 to 150° C.

The apparatus for fabricating the membrane-electrode-subgasket assembly may further include a drying device between the cutting unit and the first pressing unit.

In accordance with an embodiments of the present disclosure, there is provided a method for fabricating a membrane-electrode-subgasket assembly, the method including a feeding step of feeding a membrane-electrode assembly sheet having catalyst layers provided on both surfaces thereof, a cutting step of forming a cut line in the fed membrane-electrode assembly sheet, a separation step of separating a membrane-electrode assembly from the membrane-electrode assembly sheet having the cut line formed therein, a first lamination step of laminating the separated membrane-electrode assembly onto a first subgasket, and a second lamination step of laminating a second subgasket onto the membrane-electrode assembly, wherein the cutting roller forms the cut line by punching portions outside each of the catalyst layers.

The cut line may be formed by a cutting roller, the membrane-electrode assembly may be separated by a suction roller, and the separated membrane-electrode assembly and the first subgasket may be laminated to each other by the suction roller and a hot roller.

The cutting roller in the cutting step may include cutting blades that protrude at predetermined intervals, the cutting blades may protrude in a square frame shape, and the cutting roller may form the cut line by pressing the cutting blades against the membrane-electrode assembly sheet.

The cut line may be formed in a square frame shape, the cut line may be formed at a predetermined distance from the edge of each catalyst layer formed on the membrane-electrode assembly sheet, and may be formed so that the catalyst layer may be included inside the cut line in the square frame shape.

The membrane-electrode assembly in the separation step may include an electrolyte membrane and catalyst layers provided on both surfaces of the electrolyte membrane.

In the separation step, the membrane-electrode assembly may be sucked and separated by the suction force of the suction roller.

The membrane-electrode assembly may be separated along the cut line formed in the membrane-electrode assembly sheet.

In the cutting step, the membrane-electrode assembly sheet and the membrane-electrode assembly may be connected to each other by tension with respect to the cut line, and in the separation step, the suction force of the suction roller may be greater than the tension.

In the first lamination step, the suction roller and the hot roller may laminate the membrane-electrode assembly sucked to the suction roller onto the first subgasket transferred to the hot roller, by applying heat and pressure thereto.

BRIEF DESCRIPTION OF THE DRAWINGS

The above and other features of embodiments of the present disclosure will now be described in detail with reference to certain exemplary examples thereof illustrated in the accompanying drawings which are given herein below by way of illustration only, and thus are not limitative of the present disclosure, and wherein.

DETAILED DESCRIPTION OF ILLUSTRATIVE EMBODIMENTS

The above objects, other objects, features and advantages of embodiments of the present disclosure will become apparent with reference to the exemplary embodiments described below in conjunction with the accompanying drawings. However, the present disclosure is not limited to the embodiments disclosed below and may be embodied in a variety of different forms. Rather, these embodiments disclosed herein are provided so that this disclosure will be thorough and complete, and will fully convey the spirit of the present disclosure to those skilled in the art.

Throughout the specification and the accompanying drawings, like reference numerals refer to like components. In the accompanying drawings, the dimensions of structures are exaggerated for clarity of illustration. Although terms such as "first" and "second" may be used to describe various components, the components should not be limited by these terms. These terms are used only to distinguish one component from another component. For example, a first component may be termed a second component without departing from the scope of the present disclosure, and similarly, a second component may also be termed a first component. Singular expressions include plural expressions unless the context clearly indicates otherwise.

In the present specification, it should be understood that terms such as "include" and "have" are intended to denote the existence of mentioned characteristics, numbers, steps, operations, components, parts, or combinations thereof, but do not exclude the probability of existence or addition of one or more other characteristics, numbers, steps, operations, components, parts, or combinations thereof. In addition, when a part, such as a layer, film, region, plate, or the like, is referred to as being "on" or "above" another part, it not only refers to a case where the part is directly above the other part, but also a case where a third part exists therebetween. Conversely, when a part, such as a layer, film, region, plate, or the like, is referred to as being "below" another part, it not only refers to a case where the part is directly below the other part, but also a case where a third part exists therebetween.

Since all numbers, values and/or expressions referring to quantities of components, reaction conditions, polymer compositions, and mixtures used in the present specification are subject to various uncertainties of measurement encountered in obtaining such values, unless otherwise indicated, all are to be understood as modified in all instances by the term "about." Where a numerical range is disclosed herein, such a range is continuous, inclusive of both the minimum and maximum values of the range as well as every value between such minimum and maximum values, unless otherwise indicated. Still further, where such a range refers to integers, every integer between the minimum and maximum values of such a range is included, unless otherwise indicated.

In the present specification, where a range is stated for a parameter, it will be understood that the parameter includes all values within the stated range, inclusive of the stated endpoints of the range. For example, a range of 5 to 10 will be understood to include the values 5, 6, 7, 8, 9, and 10, as well as any sub-range such as 6 to 10, 7 to 10, 6 to 9, and 7 to 9, and also include any value and range between the integers which are reasonable in the context of the range stated, such as 5.5, 6.5, 7.5, 5.5 to 8.5 and 6.5 to 9. For example, a range of "10% to 30%" will be understood to include the values 10%, 11%, 12%, 13%, etc., and all integers up to and including 30%, as well as any sub-range such as 10% to 15%, 12% to $1^8$%, 20% to 30%, etc., and also include any value between the integers which are reasonable in the context of the range stated, such as 10.5%, 15.5%, 25.5%, etc.

Embodiments of the present disclosure relate to an apparatus for fabricating a membrane-electrode-subgasket assembly 30 and a method for fabricating the membrane-electrode-subgasket assembly 30. Particular embodiments of the present disclosure provide an apparatus and a method for efficiently fabricating the membrane-electrode-subgasket assembly 30 in a continuous fabrication process by using a cutting roller 200, which forms a cut line 13 in a membrane-electrode assembly sheet 10, and a suction roller 300 which sucks a membrane-electrode assembly 40 using a suction force and laminates the sucked membrane-electrode assembly 40 onto a subgasket 20.

Figure 2:
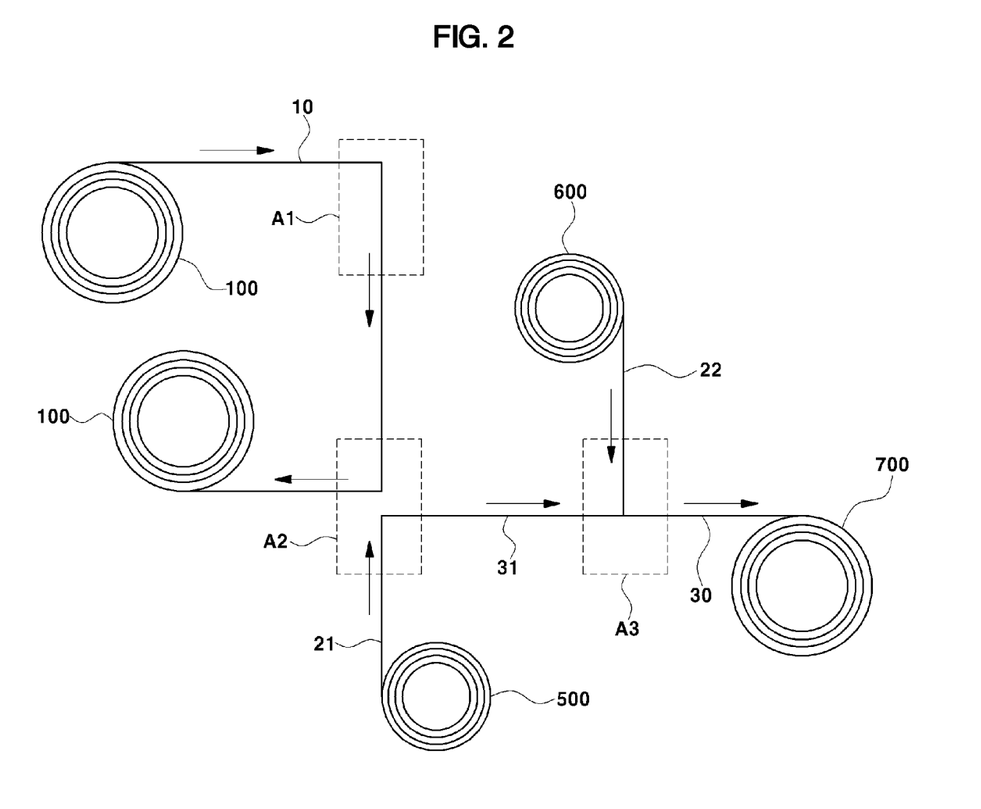
FIG. 2 is a view showing a process for fabricating a membrane-electrode-subgasket assembly according to an embodiment of the present disclosure.
Figure 8:
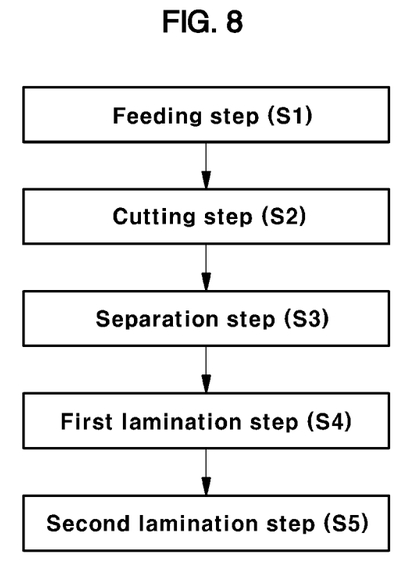
FIG. 8 shows a flow chart of a process for fabricating a membrane-electrode-subgasket assembly according to an embodiment of the present disclosure.

FIG. 2 shows an overall process diagram of embodiments of the present disclosure, and FIG. 8 shows a flow chart of the fabrication method according to embodiments of the present disclosure.

Hereinafter, the fabrication apparatus and each component thereof according to embodiments of the present disclosure will be described based on FIG. 2 with reference to FIGS. 3 to 7, and the fabrication method and each step thereof according to embodiments of the present disclosure will be described based on FIG. 8 with reference to FIGS. 9 to 11.

Apparatus for Fabricating Membrane-Electrode-Subgasket Assembly

The apparatus for fabricating the membrane-electrode-subgasket assembly 30 according to embodiments of the present disclosure includes a feeding unit including a sheet feeding roller 100 configured to feed a membrane-electrode assembly sheet 10 having catalyst layers 11 provided on both surfaces thereof, a cutting unit A1 including a cutting roller 200 and a support roller 800 configured to rotate in engagement with the cutting roller 200; a first pressing unit A2 including a suction roller 300 and a hot roller 400, a second pressing unit A3 including hot rollers 400, and an assembly recovery roller 700 configured to recover the membrane-electrode-subgasket assembly 30.

In particular, the apparatus according to embodiments of the present disclosure includes the cutting roller 200 that punches portions outside each catalyst layer 11.

Hereinafter, each component of the apparatus will be described with reference to FIGS. 2 to 7.

Feeding Unit

The feeding unit of embodiments of the present disclosure includes a sheet feeding roller 100 configured to feed the membrane-electrode assembly sheet 10.

The membrane-electrode assembly sheet 10 has catalyst layers 11 provided on both surfaces thereof. Preferably, on one surface of the membrane-electrode assembly sheet 10, two or more catalyst layers 11 are formed at a predetermined distance from each other.

The membrane-electrode assembly sheet 10 wound around the sheet feeding roller 100 is transferred to the cutting unit A1 while being unwound.

Cutting Unit

The cutting unit A1 of embodiments of the present disclosure includes a cutting roller 200 and a support roller 800 configured to rotate in engagement with the cutting roller 200. More specifically, the cutting roller 200 and the support roller 800 rotate in engagement with each other while forming a cut line 13 in the membrane-electrode assembly sheet 10 transferred from the feeding unit and interposed therebetween.

Figure 3:
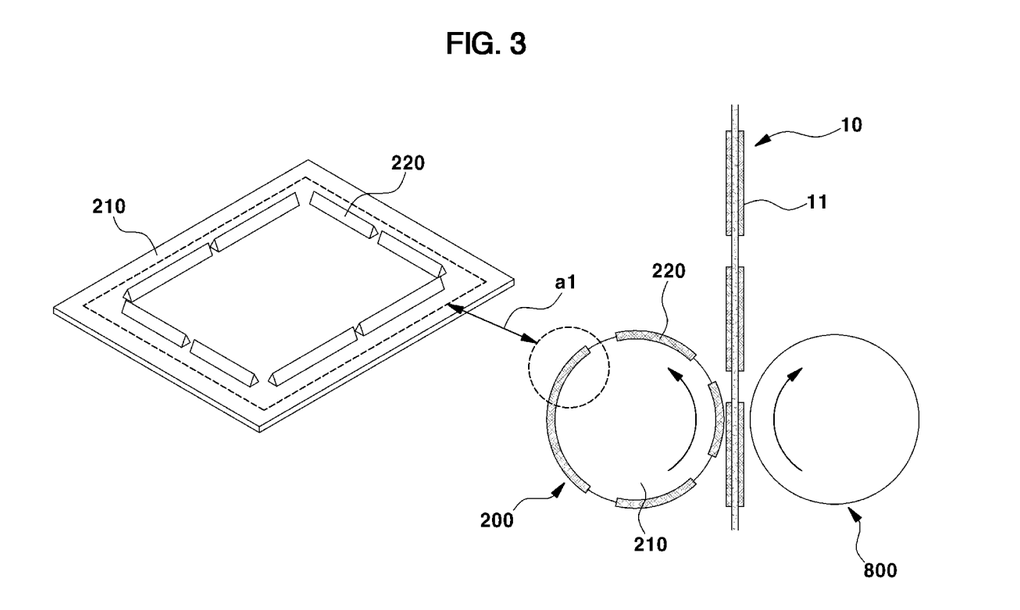
FIG. 3 shows the structure of a cutting roller according to an embodiment of the present disclosure.

Referring to FIG. 3, the cutting roller 200 includes a cylindrical cutting body 210 configured to rotate about a central shaft thereof and one or more cutting blade portions a1 provided on the outer circumferential surface of the cutting body 210 along the rotation direction of the cutting body 210.

The cutting roller 200 may include at least one cutting blade portion a1 provided on an outer circumferential surface thereof in at least one of a rotation direction of the cutting body 210 and a height direction of the cutting body 210.

The cutting blade portion a1 includes cutting blades 220 that protrude in a square frame shape, and a cut line 13 is formed in the shape of the cutting blade 220 in the membrane-electrode assembly sheet 10 by the cutting blades 220. At this time, the cutting blades 220 discontinuously protrude, and the cut line 13 is also discontinuously formed in a square frame shape.

The number or area size of the discontinuous portions is not particularly limited in the present disclosure, and the number and area size of the discontinuous portions may be sufficiently adjusted as necessary as long as the membrane-electrode assembly 40 has a tension enough to remain fixed until it is separated from the membrane-electrode assembly sheet 10 by the suction roller 300.

More detailed matters will be discussed later when explaining the fabrication method.

The support roller 800 serves to support the membrane-electrode assembly sheet 10 to be transferred so that the cutting blades 220 of the cutting roller 200 may form a cut line in the membrane-electrode assembly sheet 10 by the application of sufficient pressure.

First Pressing Unit

The first pressing unit A2 of embodiments of the present disclosure includes a suction roller 300 and a hot roller 400 configured to rotate in engagement with the suction roller 300.

Figure 4:
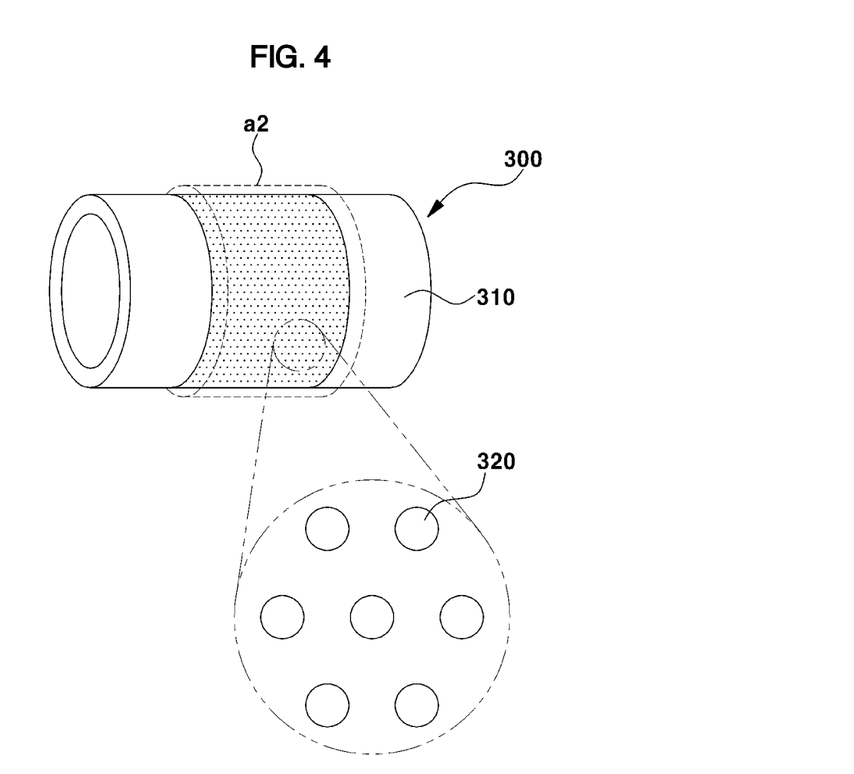
FIG. 4 shows the structure of a suction roller according to an embodiment of the present disclosure.

The suction roller 300 includes a cylindrical suction body 310 configured to rotate about a central shaft thereof and a suction portion a2 formed on an outer circumferential surface of the suction body 310 and including at least one suction hole 320.

Referring to FIG. 4, a plurality of suction holes 320 are formed in the suction portion a2 of the suction roller 300, and gas movement occurs through the holes. More specifically, the suction roller 300 sucks external air through the suction holes, and uses the suction force generated at that time to suck an external object, that is, the membrane-electrode assembly 40.

The suction force may be sufficient to completely separate the membrane-electrode assembly 40 from the membrane-electrode assembly sheet 10 having the cut line 13 formed therein. Preferably, the suction force should be greater than or equal to the tension generated between the membrane-electrode assembly sheet 10 and the membrane-electrode assembly 40 with respect to the cut line 13.

The suction roller 300 may rotate simultaneously with suction of the membrane-electrode assembly 40, and generate constant heat as needed.

Figure 5:
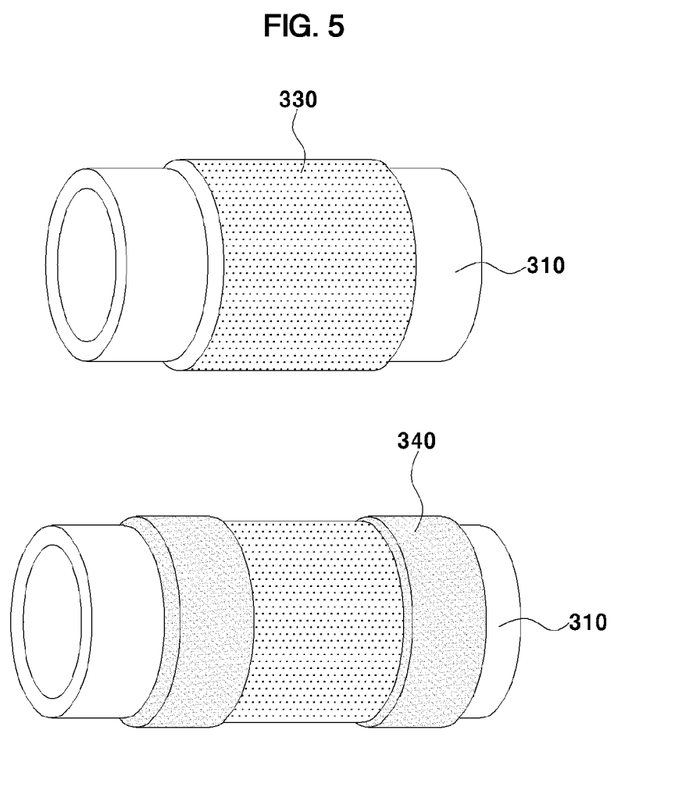
FIG. 5 shows additional components of the suction roller according to an embodiment of the present disclosure.

The suction roller 300 of embodiments of the present disclosure may further include a buffer member 330 and a fixing member 340.

Referring to FIG. 5, it can be seen that the suction roller 300 may further include the buffer member 330 configured to surround the suction roller 300 on an outer circumferential surface thereof, and the fixing members 340 are located along both edges of the buffer member 330 configured to surround the suction roller 300.

The buffer member 330 serves to prevent damage to the sucked membrane-electrode assembly 40 by dispersing the suction force transmitted from the suction holes. In addition, the buffer member 330 serves to relieve to some extent the external pressure acting on the sucked membrane-electrode assembly 40. Specifically, the buffer member 330 serves to prevent damage to the membrane-electrode assembly 40 by relieving to some extent a pressure imbalance generated when the sucked membrane-electrode assembly 40 is bonded to the subgasket 20.

The buffer member 330 preferably has porosity so that the suction of the membrane-electrode assembly 40 by the suction roller 300 can sufficiently proceed, and the buffer member 330 has excellent heat resistance, chemical resistance and releasability. That is, the buffer member 330 should have sufficient heat resistance to withstand heat generated in the suction roller 300. In addition, the buffer member 330 should have releasability so that the sucked membrane-electrode assembly 40 may be released from the suction roller 300 without damaging the sucked membrane-electrode assembly 40 when the sucked membrane-electrode assembly 40 is pressed onto the subgasket 20.

The buffer member 330 may preferably include expanded polytetrafluoroethylene (e-PTFE).

The thickness of the buffer member 330 is 100 μm or less, preferably 20 to 100 μm.

The buffer member 330 has a porosity of 60 to 70% and an airflow rate of 0.060 to 0.070 cfm.

The fixing member 340 serves to prevent the suction force from decreasing due to leakage of a large amount of gas into the space at both ends of the buffer member 330. In addition, the fixing member 340 serves to fix the buffer member 330 to the suction roller.

For the fixing member 340, any one of stainless steel and rubber may be used, and any material capable of performing all of the above functions may be used without particular limitation.

Figure 6:
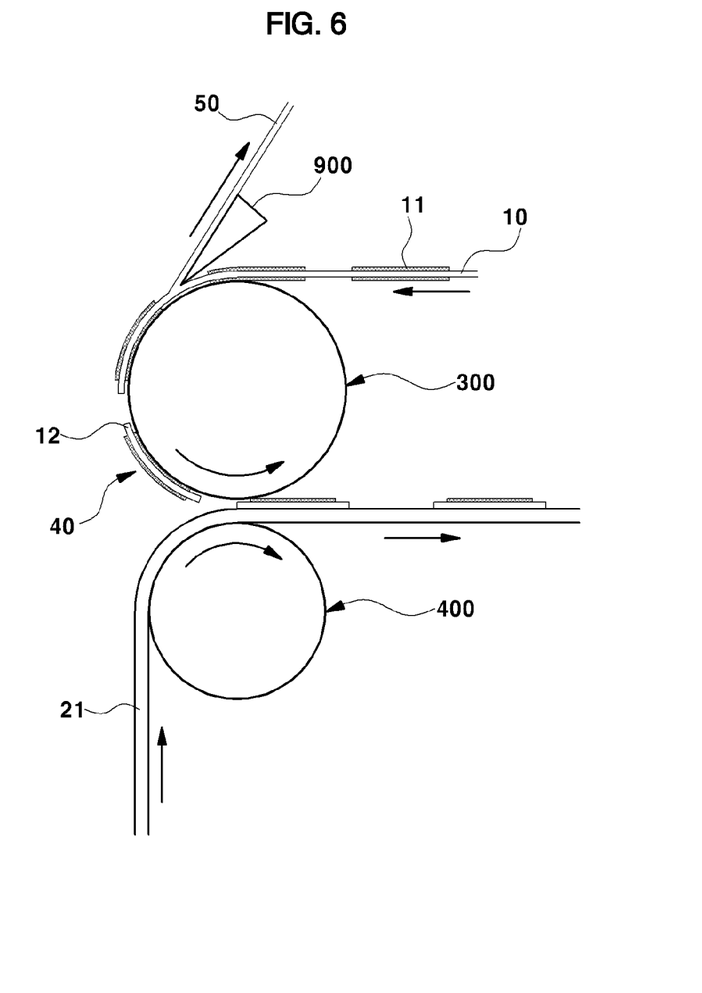
FIG. 6 shows the configuration and process of a first pressing unit according to an embodiment of the present disclosure.
Figure 7:
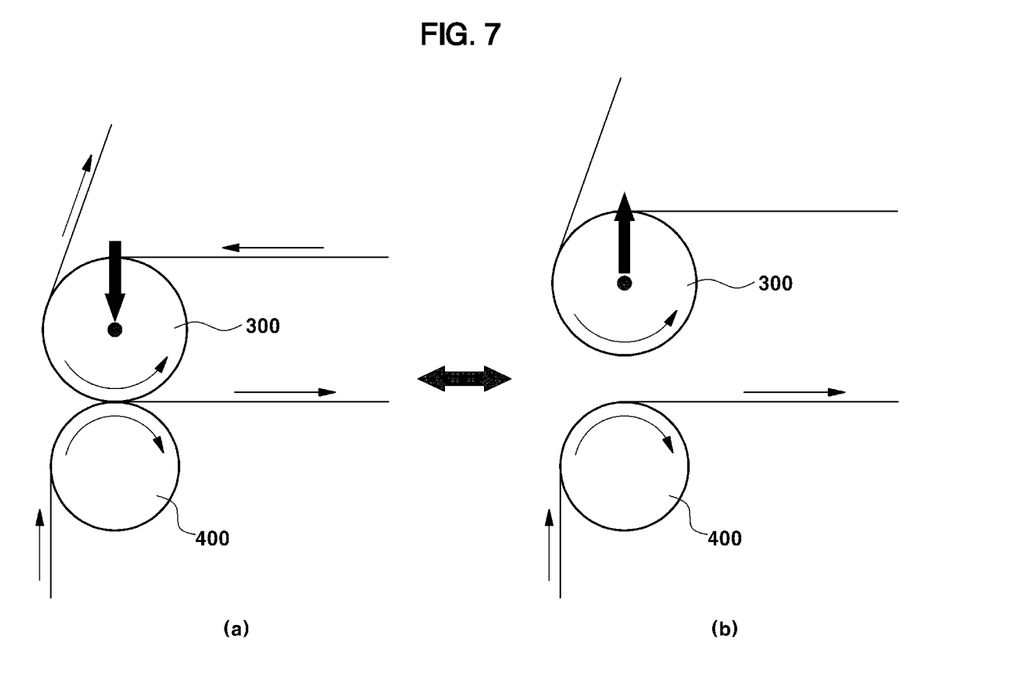
FIG. 7 shows the operations of a suction roller and a hot roller.

The hot roller 400 included in the first pressing unit A2 generates heat by engaging with the suction roller 300 in order to hot-press the fed subgasket 20 and the fed membrane-electrode assembly 40.

The subgasket 20 of embodiments of the present disclosure includes a first subgasket 21 and a second subgasket 22, which are hot-pressed onto both surfaces of the membrane-electrode assembly 40, respectively, and in the first pressing unit A2 of embodiments of the present disclosure, the first subgasket 21 is first hot-pressed.

Referring to FIGS. 2 and 6, the suction roller 300 and the hot roller 400 rotate in engagement with each other, and the membrane-electrode assembly 40 sucked onto the suction roller 300 contacts the first subgasket 21, which is transferred through the hot roller 400, at a point where the two rollers engage with each other, and receives constant pressure and heat so that hot pressing is performed. At this time, the membrane-electrode assembly sheet 10 having the cut line formed therein transfers the membrane-electrode assembly 40 to the suction roller 300. Thereafter, the membrane-electrode assembly 40 is separated from the membrane-electrode assembly sheet 10, and the remaining sheet 50 is recovered by a sheet recovery roller 110.

In embodiments of the present disclosure, a separating member 900 may be used to facilitate the separation of the membrane-electrode assembly 40. The separating member 900 serves to reduce the tension generated between the membrane-electrode assembly sheet 10 and the membrane-electrode assembly 40 while pressing the membrane-electrode assembly 40 to more closely adhere to the suction roller 300.

The separating member 900 may have a shape that narrows toward a point where the membrane-electrode assembly 40 and the membrane-electrode assembly sheet 10 are separated from each other, so as to transmit an external force as much as possible to the point. Preferably, the separating member 900 may include a shape such as a blade.

Referring to FIG. 2, in embodiments of the present disclosure, the first subgasket 21 is fed by a first subgasket 21 feeding roller, and receives the membrane-electrode assembly 40 in the first pressing unit A2 to form a pre-assembly 31.

As described above, the suction roller 300 of embodiments of the present disclosure may linearly move with respect to the hot roller 400 by a predetermined distance in order to transfer the membrane-electrode assembly 40 to the first subgasket 21 and simultaneously, to apply heat and pressure thereto. In this regard, referring to FIGS. 2 and 7, immediately before the membrane-electrode assembly 40 is transferred to the first subgasket 21, both the sheet feeding roller 100 and the sheet recovery roller 110 stop, and the suction roller 300 is spaced apart from the hot roller 400 by a predetermined distance while sucking the membrane-electrode assembly 40. In addition, when the membrane-electrode assembly 40 is transferred to the first subgasket 21, both the sheet feeding roller 100 and the sheet recovery roller 110 operate, and the suction roller 300 engages with the hot roller 400 and rotates according to the rotational speed of the hot roller 400. This is an inevitable process that occurs due to a difference between the spacing between the catalyst layers 11 formed on the membrane-electrode assembly sheet 10 of embodiments of the present disclosure and the spacing between openings formed in the subgasket 20. The moving distance and time of the suction roller 300 spaced apart from the hot roller 400 by a predetermined distance may vary depending on conditions such as the moving speed of the subgasket 20, and a difference between the spacing between the catalyst layers 11 formed on the membrane-electrode assembly sheet 10 and the spacing between the openings formed in the subgasket 20.

The temperature of the hot roller 400 in the first pressing unit A2 is 50 to 150° C. Preferably, the temperature of the suction roller 300 may also be the same as that of the hot roller 400.

The apparatus for fabricating the membrane-electrode-subgasket assembly 30 according to embodiments of the present disclosure may further include a drying device between the cutting unit A1 and the first pressing unit A2.

The drying device serves to reduce moisture in the membrane-electrode assembly sheet 10, so that the membrane-electrode assembly sheet 10 may be easily stretched without wrinkles. In addition, the drying device serves to help the membrane-electrode assembly 40 to shrink better with respect to the cut line 13, so that the membrane-electrode assembly 40 may be separated smoothly from the membrane-electrode assembly sheet 10 even by a low suction force.

The drying device may include a device that generates infrared rays, hot air, or the like, and the heat transferred to the membrane-electrode assembly sheet 10 has a temperature of 70 to 120° C. If heat having a temperature lower than 70° C. is transferred to the membrane-electrode assembly sheet 10, it may be difficult to evaporate moisture as much as desired, and if heat having a temperature higher than 120° C. is transferred to the membrane-electrode assembly sheet 10, a problem may arise in that severe deformation of the membrane-electrode assembly sheet 10 occurs.

Second Pressing Unit

The second pressing unit A3 of embodiments of the present disclosure includes a pair of hot rollers 400 configured to rotate in engagement with each other.

Referring to FIG. 2, a second subgasket 22 is additionally provided to the pre-assembly 31 including the first subgasket 21 and the membrane-electrode assembly 40, and at this time, hot pressing is performed by the pair of hot rollers 400 included in the second pressing unit A3.

The hot rollers 400 may have the same temperature range as the hot roller 400 included in the first pressing unit A2.

Recovery Unit

The recovery unit of embodiments of the present disclosure includes an assembly recovery roller 700 configured to recover the membrane-electrode-subgasket assembly 30 including the first subgasket 21, the membrane-electrode assembly 40 and the second subgasket 22. The first subgasket 21 feeding roller and the second subgasket 22 feeding roller rotate in accordance with the rotational speed of the assembly recovery roller 700 and feed the subgasket 20, and the pre-assembly 31 and the membrane-electrode-subgasket assembly 30 are transferred.

Method for Fabricating Membrane-Electrode-Subgasket Assembly

The method for fabricating the membrane-electrode-subgasket assembly 30 according to embodiments of the present disclosure includes a feeding step of feeding the membrane-electrode assembly sheet 10 having the catalyst layers 11 provided on both surfaces thereof, a cutting step of forming the cut line 13 in the fed membrane-electrode assembly sheet 10, a separation step of separating the membrane-electrode assembly 40 from the membrane-electrode assembly sheet 10 having the cut line formed therein, a first lamination step of laminating the separated membrane-electrode assembly 40 onto the first subgasket 21, and a second lamination step of laminating the second subgasket 22 onto the membrane-electrode assembly 40.

Hereinafter, each step of the fabrication method according to embodiments of the present disclosure will be described based on the process diagram of FIG. 2 and the flow chart of FIG. 8 with reference to FIGS. 9 to 11. However, the overlapping contents discussed above with respect to the apparatus for fabricating the membrane-electrode-subgasket assembly 30 will be omitted herein.

Feeding Step (S1)

The feeding step (S1) is a step of feeding the membrane-electrode assembly sheet 10 having the catalyst layers 11 provided on both surfaces thereof.

Figure 9:
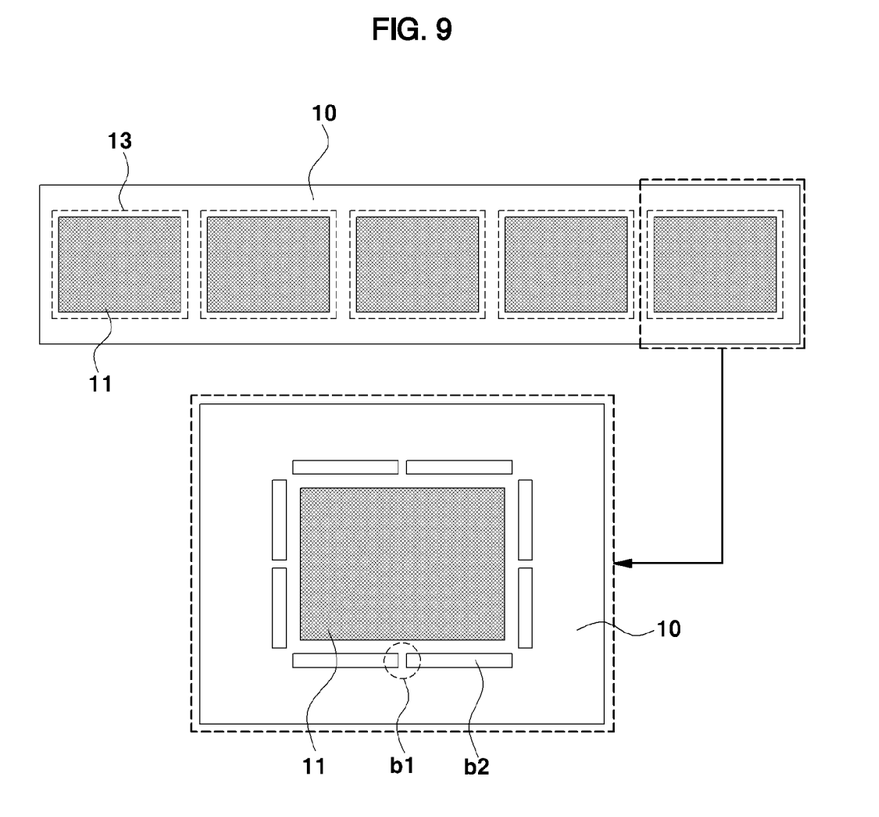
FIG. 9 shows an example in which a cut line is formed by the cutting roller of an embodiment of the present disclosure.

Referring to FIG. 9, it can be seen that the catalyst layers 11 are formed at a predetermined distance from each other on the surface of the membrane-electrode assembly sheet 10. At this time, the distance between the catalyst layers 11 is preferably 50 mm to 20 mm.

Cutting Step (S2)

The cutting step (S2) is a step of forming the cut line 13 in the fed membrane-electrode assembly sheet 10. More specifically, the cut line 13 is formed in the membrane-electrode assembly sheet 10 by the cutting blades 220 of the cutting roller 200 included in the cutting unit A1.

The cutting roller 200 includes cutting blades 220 protruding at regular intervals, and the cutting blades 220 protrude in a square frame shape.

The cutting roller 200 forms the cut line 13 in the membrane-electrode assembly sheet 10 by pressing the protruding cutting blades 220 against the membrane-electrode assembly sheet 10. At this time, the cut line 13 is formed so as to correspond to the number of the catalyst layers 11 formed on one surface of the membrane-electrode assembly sheet 10.

Referring to FIG. 9, it can be seen that the cut line 13 is formed in a square frame shape according to the shape of the cutting blades 220, and the cut line 13 is formed at a predetermined distance from the edge of each catalyst layer 11 formed on the membrane-electrode assembly sheet 10. At this time, the catalyst layer 11 is included inside the cut line 13 having a square frame shape.

Since the cutting blades 220 discontinuously protrude, they may form a discontinuous cut line 13 in the membrane-electrode assembly sheet 10. At this time, the uncut portion in the cut line 13 is referred to as a connection part b1, and the cut portion in the cut line 13 is referred to as a cut portion b2.

The membrane-electrode assembly including the catalyst layer 11 located inside the cut line 13 may be fixed to the membrane-electrode assembly sheet 10 by maintaining tension through the connection portion b1. That is, in embodiments of the present disclosure, a single membrane-electrode assembly 40 may be connected to the membrane-electrode assembly sheet 10 by a tension generated over the total area of all the connection portions b1 generated in the single membrane-electrode assembly 40.

Separation Step (S3)

The separation step (S3) is a step of separating the membrane-electrode assembly 40 from the membrane-electrode assembly sheet 10 having the cut line 13 formed therein. More specifically, the membrane-electrode assembly 40 is separated from the membrane-electrode assembly sheet 10 by the suction roller 300 included in the first pressing unit A2.

Figure 10:
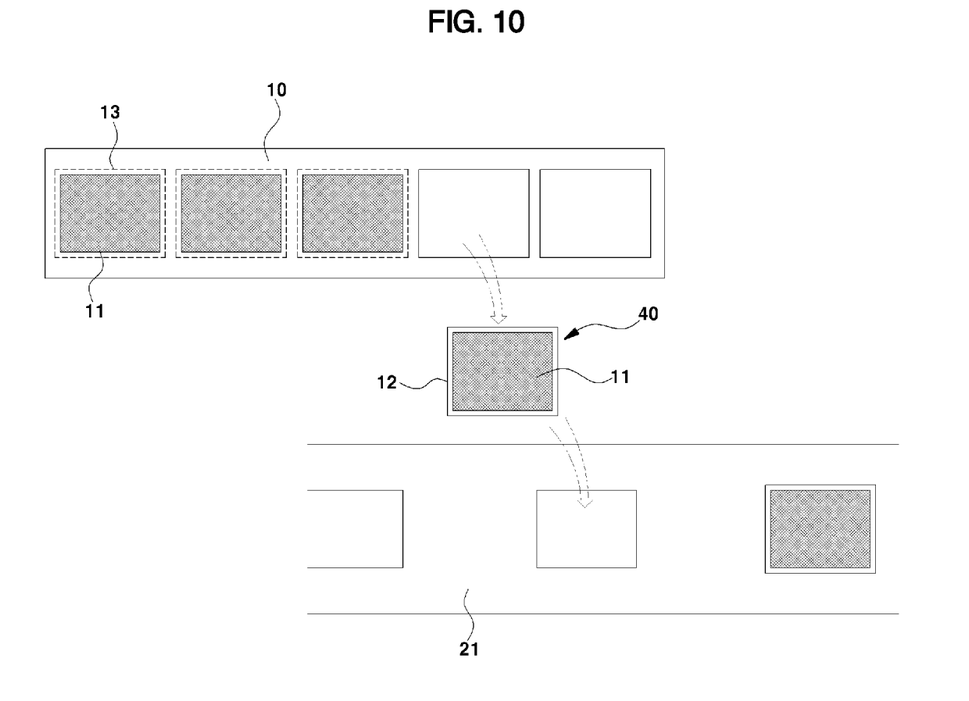
FIG. 10 shows a process of separating and pressing a membrane-electrode assembly.

Referring to FIG. 10, it can be seen that the membrane-electrode assembly 40 including the catalyst layers 11 is separated from the membrane-electrode assembly sheet 10 along the cut line 13. More specifically, the membrane-electrode assembly 40 may include an electrolyte membrane 12 and catalyst layers 11 provided on both surfaces of the electrolyte membrane 12.

The separation is performed by a suction force, which is generated by the suction roller 300 and acts on the membrane-electrode assembly 40 located inside the cut line 13 in the membrane-electrode assembly sheet 10. Specifically, the suction roller applies to the membrane-electrode assembly 40 a suction force greater than the tension generated in the total area of all the connection portions b1 generated in a single membrane-electrode assembly 40, thereby sucking the membrane-electrode assembly 40 while cutting off all the connection portions b1.

First Lamination Step (S4)

The first lamination step (S4) is a step of laminating the separated membrane-electrode assembly 40 onto the first subgasket 21. More specifically, the membrane-electrode assembly 40 separated by the suction roller 300 and hot roller 400 included in the first pressing unit A2 is laminated onto the first subgasket 21 by hot pressing.

Referring to FIG. 6, it can be seen that the membrane-electrode assembly 40 is separated from the membrane-electrode assembly sheet 10 and is sucked and transferred by the suction roller 300, and the first subgasket 21 is transferred by the hot roller 400.

The membrane-electrode assembly 40 and the first subgasket 21 meet at one point and are hot-pressed by receiving heat and pressure from the suction roller 300 and the hot roller 400. At this time, the first subgasket 21 is provided to one of both surfaces of the membrane-electrode assembly 40, and hot pressing is performed such that a portion of each catalyst layer 11 positioned on one surface of the membrane-electrode assembly 40 is exposed through the opening of the first subgasket 21.

Referring to FIG. 10, it can be seen that the separated membrane-electrode assembly 40 is laminated to the opening of the first subgasket 21 to form a pre-assembly 31.

In embodiments of the present disclosure, the suction roller 300 performs both suction and pressing of the membrane-electrode assembly 40.

Second Lamination Step (S5)

The second lamination step (S5) is a step of laminating a second subgasket 22 onto the membrane-electrode assembly 40. Specifically, this step is a step in which the second subgasket 22 is provided to a surface other than the one surface of the membrane-electrode assembly 40, to which the first subgasket is provided, and is hot-pressed by the hot rollers 400.

Referring to FIG. 2, the second subgasket 22 is separately provided by a second subgasket roller, and is laminated and hot-pressed to the pre-assembly 31 in the second pressing unit A3.

The hot pressing is performed by a pair of hot rollers 400 in a state in which the pre-assembly 31 and the second subgasket 22 positioned on the pre-assembly 31 are interposed between the hot rollers 400.

The subgasket 20 that is used in embodiments of the present disclosure includes an adhesive on the surface thereof in contact with the membrane-electrode assembly 40.

The adhesive has bonding strength by being exposed to the hot-pressing temperature of embodiments of the present disclosure, and completely bonds the membrane-electrode assembly 40 and the subgasket 20 to each other, or completely bonds the first subgasket 21 and the second subgasket 22 to each other.

The adhesive preferably includes urethane and epoxy. More preferably, the adhesive includes urethane and epoxy at a weight ratio of 1:9 to 3:7.

Membrane-Electrode-Subgasket Assembly

Figure 11:
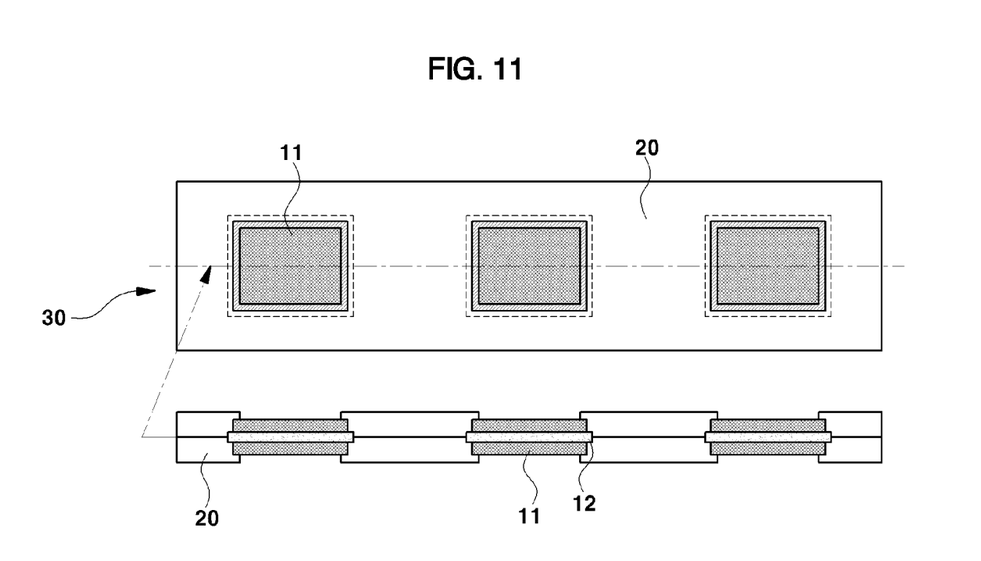
FIG. 11 shows the structure of a membrane-electrode-subgasket assembly of an embodiment of the present disclosure for comparison with the structure of a membrane-electrode-subgasket assembly of a conventional art.

FIG. 11 shows a top view and a sectional view of the membrane-electrode-subgasket assembly 30 of embodiments of the present disclosure. When comparing the membrane-electrode-subgasket assembly 30 with the conventional membrane-electrode-subgasket assembly 30' shown in FIG. 1, it can be seen that, in the membrane-electrode-subgasket assembly 30 of embodiments of the present disclosure, the electrolyte membrane is not located in a portion corresponding to a region A of the conventional membrane-electrode-subgasket assembly 30'.

As described above, according to embodiments of the present disclosure, it is possible to provide an apparatus and a method for efficiently fabricating a membrane-electrode-subgasket assembly in a continuous fabrication process without wasting an electrolyte membrane.

According to embodiments of the present disclosure, it is possible to provide a fabrication apparatus having a novel structure and a fabrication method, which enable both suction of the membrane-electrode assembly and hot pressing of the membrane-electrode assembly to subgaskets in a continuous fabrication process.

According to embodiments of the present disclosure, it is possible to provide an apparatus and a method for fabricating a membrane-electrode-subgasket assembly, which may use an adhesive while enabling both suction of the membrane-electrode assembly and hot pressing of the membrane-electrode assembly to subgaskets to be efficiently performed in a continuous fabrication process.

According to embodiments of the present disclosure, it is possible to provide an apparatus and a method for fabricating a membrane-electrode-subgasket assembly, which are capable of efficiently controlling the amount of electrolyte membrane used in a continuous fabrication process and achieving a high fabrication yield of a membrane-electrode-subgasket assembly.

The effects of embodiments of the present disclosure are not limited to the above-mentioned effects. It is to be understood that the effects of embodiments of the present disclosure include all effects that may be deduced from the above description.

What is claimed is:

1. An apparatus for fabricating a membrane-electrode-subgasket assembly, the apparatus comprising:
    a feeding unit comprising a sheet feeding roller configured to feed a membrane-electrode assembly sheet having catalyst layers provided on both surfaces thereof;
    a cutting unit comprising a cutting roller and a support roller configured to rotate in engagement with the cutting roller, wherein the cutting roller is configured to partially punch portions outside each of the catalyst layers;
    a first pressing unit comprising a suction roller and a first hot roller; and
    a second pressing unit comprising second hot rollers.

2. The apparatus of claim 1, wherein the cutting roller comprises:

a cylindrical cutting body configured to rotate about a central shaft thereof; and a cutting blade portion provided on an outer circumferential surface of the cutting body along a rotation direction of the cutting body.

3. The apparatus of claim 2, wherein the cutting blade portion comprises cutting blades protruding in a square frame shape.

4. The apparatus of claim 3, wherein the cutting blades protrude discontinuously.

5. The apparatus of claim 1, wherein:

the suction roller and the first hot roller of the first pressing unit are configured to rotate in engagement with each other; and the second hot rollers of the second pressing unit are configured to rotate in engagement with each other.

6. The apparatus of claim 1, wherein the suction roller is configured to move linearly with respect to the first hot roller of the first pressing unit by a predetermined distance.

7. The apparatus of claim 1, wherein the suction roller comprises:

a cylindrical suction body configured to rotate about a central shaft thereof; and a suction portion formed on an outer circumferential surface of the suction body and including a suction hole.

8. The apparatus of claim 7, wherein the suction roller is configured to suck external air through the suction hole.

9. The apparatus of claim 1, further comprising a buffer member surrounding the suction roller on an outer circumferential surface of the suction roller.

10. The apparatus of claim 9, wherein the buffer member have a thickness of 100 µm or less, a porosity of 60% to 70%, and an airflow rate of 0.060 to 0.070 cfm.

11. The apparatus of claim 1, wherein the first hot roller of the first pressing unit has a temperature of 50 to 150° C.

12. The apparatus of claim 1, further comprising a drying device between the cutting unit and the first pressing unit.

13. A method of operating an apparatus for fabricating a membrane-electrode-subgasket assembly comprising a feeding unit comprising a sheet feeding roller configured to feed a membrane-electrode assembly sheet having catalyst layers provided on both surfaces thereof; a cutting unit comprising a cutting roller and a support roller configured to rotate in engagement with the cutting roller, wherein the cutting roller is configured to partially punch portions outside each of the catalyst layers; a first pressing unit comprising a suction roller and a first hot roller; and a second pressing unit comprising second hot rollers, the method comprising:

feeding the membrane-electrode assembly sheet using the feeding unit;

forming a cut line in the fed membrane-electrode assembly sheet using the cutting unit, wherein forming the cut line comprises partially punching portions outside each of the catalyst layers;

separating a membrane-electrode assembly from the membrane-electrode assembly sheet having the cut line formed therein using the suction roller;

laminating the separated membrane-electrode assembly onto a first subgasket using the first pressing unit; and laminating a second subgasket onto the membrane-electrode assembly using the second pressing unit.

14. The method of claim 13, wherein:

the cutting roller comprises cutting blades that protrude at predetermined intervals and in a square frame shape; and forming the cut line further comprises pressing the cutting blades against the membrane-electrode assembly sheet.

15. The method of claim 14, wherein the cutting blades protrude discontinuously.

16. The method of claim 13, wherein the cut line is formed in a square frame shape and at a predetermined distance from an edge of each catalyst layer formed on the membrane-electrode assembly sheet such that the catalyst layers are included inside the cut line in the square frame shape.

17. The method of claim 13, wherein, separating the membrane-electrode assembly from the membrane-electrode assembly sheet comprises sucking and separating the membrane-electrode assembly by a suction force of the suction roller, wherein the membrane-electrode assembly is separated along the cut line formed in the membrane-electrode assembly sheet.

18. The method of claim 17, wherein:

while forming the cut line, the membrane-electrode assembly sheet and the membrane-electrode assembly are connected to each other by tension with respect to the cut line; and while separating the membrane-electrode assembly from the membrane-electrode, the suction force of the suction roller is greater than the tension.

19. The method of claim 17, wherein, while laminating the separated membrane-electrode assembly onto the first subgasket the suction roller and the first hot roller laminate the membrane-electrode assembly sucked to the suction roller onto the first subgasket transferred to the first hot roller by applying heat and pressure thereto.

20. An apparatus for fabricating a membrane-electrode-subgasket assembly, the apparatus comprising:

a sheet feeding roller configured to feed a membrane-electrode assembly sheet having catalyst layers provided on both surfaces thereof;

a cutting roller and a support roller configured to rotate in engagement with the cutting roller, wherein the cutting roller is configured to partially punch portions outside each of the catalyst layers;

a suction roller and a first hot roller; and second hot rollers.

* * * * *